United States Patent
Aziz et al.

(10) Patent No.: US 10,410,265 B2
(45) Date of Patent: Sep. 10, 2019

(54) SELECTING AN IN-STORE SHOPPER TO FULFILL AN ORDER PLACED BY A REMOTE BUYER

(71) Applicant: Toshiba Global Commerce Solutions Holdings Corporation, Tokyo (JP)

(72) Inventors: Bilal Aziz, Durham, NC (US); Dean Frederick Herring, Youngsville, NC (US); Susan Brosnan, Raleigh, NC (US)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 630 days.

(21) Appl. No.: 15/151,989

(22) Filed: May 11, 2016

(65) Prior Publication Data
US 2017/0330256 A1 Nov. 16, 2017

(51) Int. Cl.
| | | |
|---|---|---|
| G06Q 30/00 | (2012.01) | |
| G06Q 30/06 | (2012.01) | |
| G06Q 20/24 | (2012.01) | |
| G06Q 30/02 | (2012.01) | |
| H04L 12/58 | (2006.01) | |
| G06Q 10/06 | (2012.01) | |
| G06Q 10/08 | (2012.01) | |

(52) U.S. Cl.
CPC ......... *G06Q 30/0613* (2013.01); *G06Q 10/06* (2013.01); *G06Q 20/24* (2013.01); *G06Q 30/0208* (2013.01); *G06Q 30/0281* (2013.01); *H04L 51/046* (2013.01); *G06Q 10/08* (2013.01)

(58) Field of Classification Search
None
See application file for complete search history.

(56) References Cited

U.S. PATENT DOCUMENTS

| | | | |
|---|---|---|---|
| 8,353,452 B2 | 1/2013 | Sharpe et al. | |
| 8,396,756 B1 | 3/2013 | Stevens | |
| 2002/0138170 A1* | 9/2002 | Onyshkevych | G06Q 30/06 700/130 |
| 2008/0201155 A1* | 8/2008 | Som | A47F 10/00 705/1.1 |
| 2009/0125394 A1 | 5/2009 | Otto et al. | |

(Continued)

OTHER PUBLICATIONS

Agatz, N. et al. "E-fulfillment and multi-channel distribution—A review." European Journal of Operational Research, vol. 187, Issue 2, Jun. 1, 2008, pp. 339-356.

*Primary Examiner* — Matthew T Sittner
(74) *Attorney, Agent, or Firm* — Coats & Bennett, PLLC (57) ABSTRACT

A computing device selects an in-store shopper to fulfill an order placed by a remote buyer. In particular, the computing device receives a message via a communications network. This message comprises a purchase order identifying an item offered for sale at a retail store. The computing device identifies a plurality of people physically located at the retail store and selects, from the plurality of people, a shopper to retrieve the item from the retail store and deliver the item to a delivery location. In particular, selecting the shopper is based on a purchase price and corresponding procurement cost of the item. The computing device transmits an order fulfillment request to a communications device associated with the shopper. The order fulfillment request identifies the item.

20 Claims, 6 Drawing Sheets

(56) References Cited

U.S. PATENT DOCUMENTS

| | | | |
|---|---|---|---|
| 2010/0010902 A1 | 1/2010 | Casey | |
| 2010/0179846 A1* | 7/2010 | Best | G06Q 30/0601 |
| | | | 705/26.1 |
| 2010/0293068 A1 | 11/2010 | Drakoulis et al. | |
| 2011/0093361 A1* | 4/2011 | Morales | G06Q 10/087 |
| | | | 705/26.62 |
| 2012/0323690 A1* | 12/2012 | Michael | G06Q 30/02 |
| | | | 705/14.58 |
| 2013/0211953 A1* | 8/2013 | Abraham | G06Q 30/06 |
| | | | 705/26.8 |
| 2013/0231990 A1* | 9/2013 | Munjal | G06Q 30/06 |
| | | | 705/14.23 |
| 2013/0297387 A1* | 11/2013 | Michael | G08G 1/0112 |
| | | | 705/13 |
| 2013/0304578 A1 | 11/2013 | Kannan et al. | |
| 2014/0279238 A1 | 9/2014 | Jones et al. | |
| 2014/0279294 A1 | 9/2014 | Field-Darragh et al. | |
| 2015/0106229 A1 | 4/2015 | Lyman | |
| 2015/0120386 A1 | 4/2015 | Sherman et al. | |
| 2015/0178778 A1* | 6/2015 | Lee | G06Q 30/0261 |
| | | | 705/14.58 |
| 2015/0242918 A1* | 8/2015 | McCarthy | G06Q 30/0617 |
| | | | 705/26.43 |
| 2016/0055563 A1* | 2/2016 | Grandhi | G06Q 30/0625 |
| | | | 705/26.62 |
| 2017/0069013 A1* | 3/2017 | Castillo | G06Q 30/0635 |
| 2017/0109783 A1* | 4/2017 | Mowry | G06Q 30/02 |
| 2017/0287053 A1* | 10/2017 | Page | G06Q 30/0633 |
| 2018/0108062 A1* | 4/2018 | McHale | G06Q 30/0617 |
| 2018/0349981 A1* | 12/2018 | Grandhi | G06Q 30/0633 |

\* cited by examiner

SELECTING AN IN-STORE SHOPPER TO FULFILL AN ORDER PLACED BY A REMOTE BUYER

TECHNICAL FIELD

The present disclosure relates generally to fulfilling orders for remote buyers, and more particularly to systems, methods, devices, and computer-program products for selecting an in-store shopper to perform an in-store order fulfillment task based on a potential profit to be made from selling an ordered item.

BACKGROUND

In a traditional retail environment, buyers locate a desired product within a store, take the item to a point of sale, pay for their item, and subsequently carry the item out of the store. Modern retailers are increasingly adopting internet-based methods of accepting orders from remote buyers. For example, some retailers allow a buyer to place an order for an item online and pick that item up from the store later. For another example, some retailers allow a remote buyer to place an order for an item online, and will deliver the item to the buyer from the closest store that has the item in stock. In at least some respects, these remote buyers place a higher burden on in-store staff than traditional in-store buyers. For example, since the buyer is not present to physically move the item from where it is stocked within the store, some retailers have an employee locate the item, and bring the item to a designated in-store pick up location. The in-store pick up location is often staffed by another employee who monitors the item to prevent theft until the buyer arrives to pick up his or her order.

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
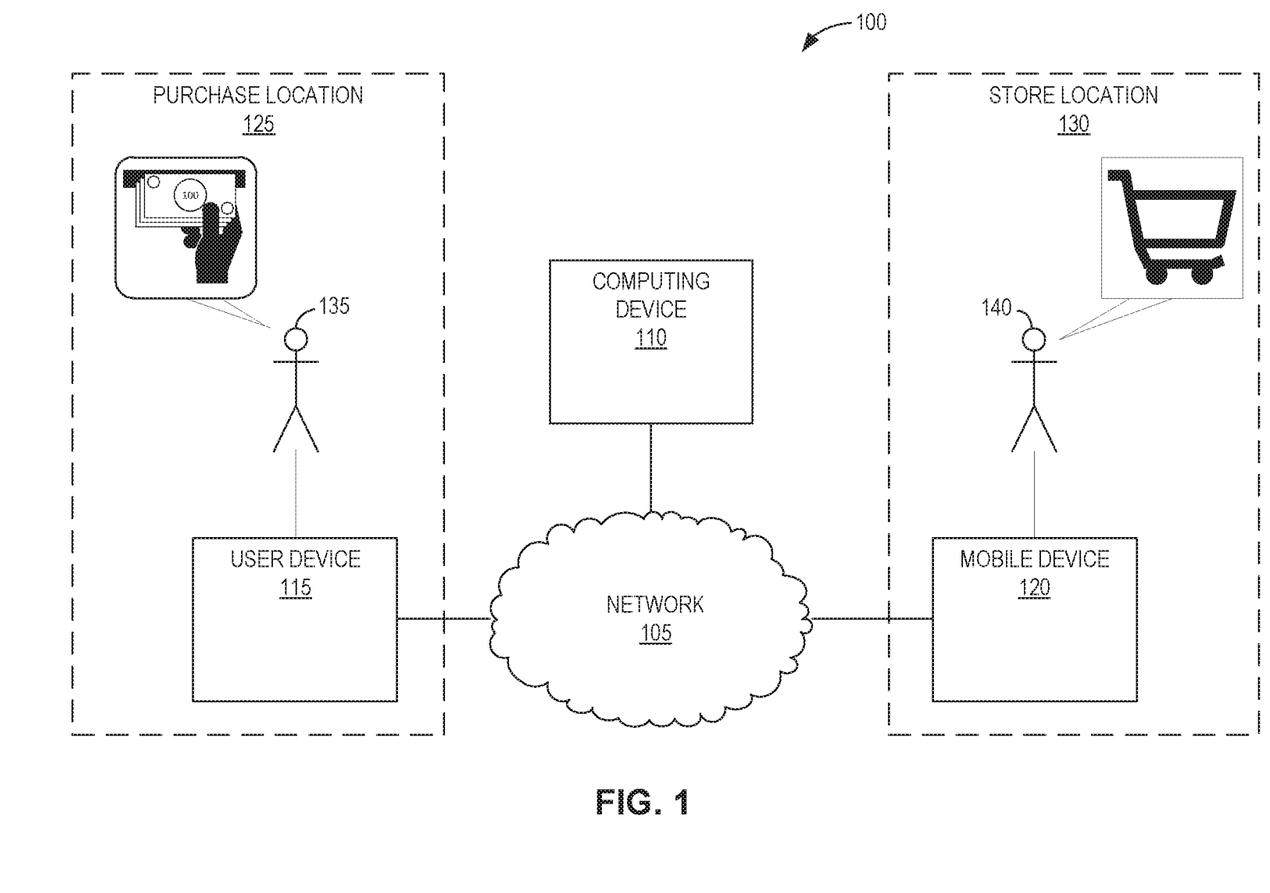
FIG. 1 is a block diagram of an example network environment according to embodiments of the present disclosure.

FIG. 1 illustrates an example network environment 100 that includes a computing device 110, a user device 115, a mobile device 120 and a network 105. The computing device 110, user device 115, and mobile device 120 are each communicatively connected to, and exchange signals with each other via, the network 105.

The mobile device 120 may be any electronic device capable of wirelessly exchanging signals with the network 105 and interfacing with a human operator, such as customer 140 at store location 130. Typical examples of the mobile device 120 include a smartphone, a tablet computer, a laptop computer, a wearable computer, and/or a smart appliance.

The store location 130 may, according to embodiments, be anywhere within or near a particular store (e.g., a clothing store) or collection of stores (e.g., a shopping mall). For example, the store location 130 may be any physical location that is within signal range of a radio device (not shown) corresponding to the store location 130. Although the example network environment 100 only contains one mobile device 120 and customer 140 at store location 130, other embodiments may include any number of mobile devices 120 and corresponding customers 140. Further, other devices and/or people may be physically present at the store location 130, though not shown in FIG. 1. For example, one or more employees (e.g., one or more stock clerks, cashiers, managers) may be at the store location, any of which may be using one or more other devices (not shown) communicatively connected to the network 105.

The user device 115 may be any electronic device capable of exchanging signals with the network 105 and interfacing with a human operator, such as buyer 135 at purchase location 125. Typical examples of the user device 115 include a personal computer, a laptop computer, a desktop computer, a workstation, a smartphone, a tablet computer, a wearable computer, and/or a smart appliance. According to embodiments, the purchase location 125 may be anywhere. More typically, the purchase location 125 will be at a location that is outside of store location 130 (e.g., at the buyer's 135 home).

The computing device 110 may be any electronic device capable of exchanging signals with the network 105. Typical examples of the computing device 110 include a server computer and/or server cluster. Other examples of the server device 110 include a personal computer, a laptop computer, a desktop computer, a workstation, a smartphone, a tablet computer, a wearable computer, a smart appliance, network attached storage, a storage area network, and/or a point of sale terminal. Although the example of FIG. 1 shows the computing device 110 outside of the store location 130 and the purchase location 125 (e.g., at a corporate datacenter), according to other embodiments, the computing device 110 may be at either the purchase location 125 or the store location 130.

The network 105 includes one or more physical devices and/or signaling mediums capable of exchanging communication signals with the user device 115, computing device 110, and mobile device 120. Examples of such a network 105 include (but are not limited to) one or more of: the Internet (or a portion thereof); one or more local area networks; one or more wireless networks; one or more cellular networks; one or more Internet Protocol-based networks; one or more Ethernet networks; one or more optical networks; one or more BLUETOOTH networks; one or more RFID networks; and/or one or more circuit switched networks. Such a network 105 may comprise any number of networking devices such as routers, gateways, switches, hubs, firewalls, and the like (not shown) supporting the exchange of such communication signals.

According to embodiments, the buyer 135 orders an item via user device 115 and network 105, and wishes to have that item delivered to a delivery location. For example, the buyer 135 may make payment online for the item and wants the item to be delivered to a designated in-store location for pickup and quick checkout. According to a different example, the buyer 135 pays online and wants to have the item delivered to his or her home address. The item buyer 135 desires is stocked at a store corresponding to store location 130. To enable fulfillment of buyer's 135 order, computing device 110 will select an in-store shopper to retrieve the item from that retail store and deliver it to the desired delivery location.

According to some embodiments, the computing device 110 may select an employee of the retail store to be the shopper. If an employee happens to be on duty and available, such an option may be attractive. However, if there is a high volume of online orders being placed, it may be very costly for the retail store to hire enough employees to handle all of those orders. Further, it can be difficult to predict how many online transactions will occur at any given time. If the retail store keeps too many employees on hand to handle too few online sales, the retail store may waste a significant amount of money in labor costs. Indeed, there may be a wide variety of reasons why selecting an employee as the shopper may not be an attractive option.

Accordingly, embodiments of the present disclosure enable the computing device to select a customer 140 as the shopper. In some embodiments, a customer 140 that is willing to act as the shopper may, for example, avoid the cost of employing additional staff to retrieve and deliver items ordered online. Further, according to some embodiments, the computing device 110 offers an incentive to the customer 140, e.g., as an attempt to motivate the customer's 140 participation in fulfilling an online order. Such an incentive may include a discount on one or more items and/or store credit, for example.

Figure 2:
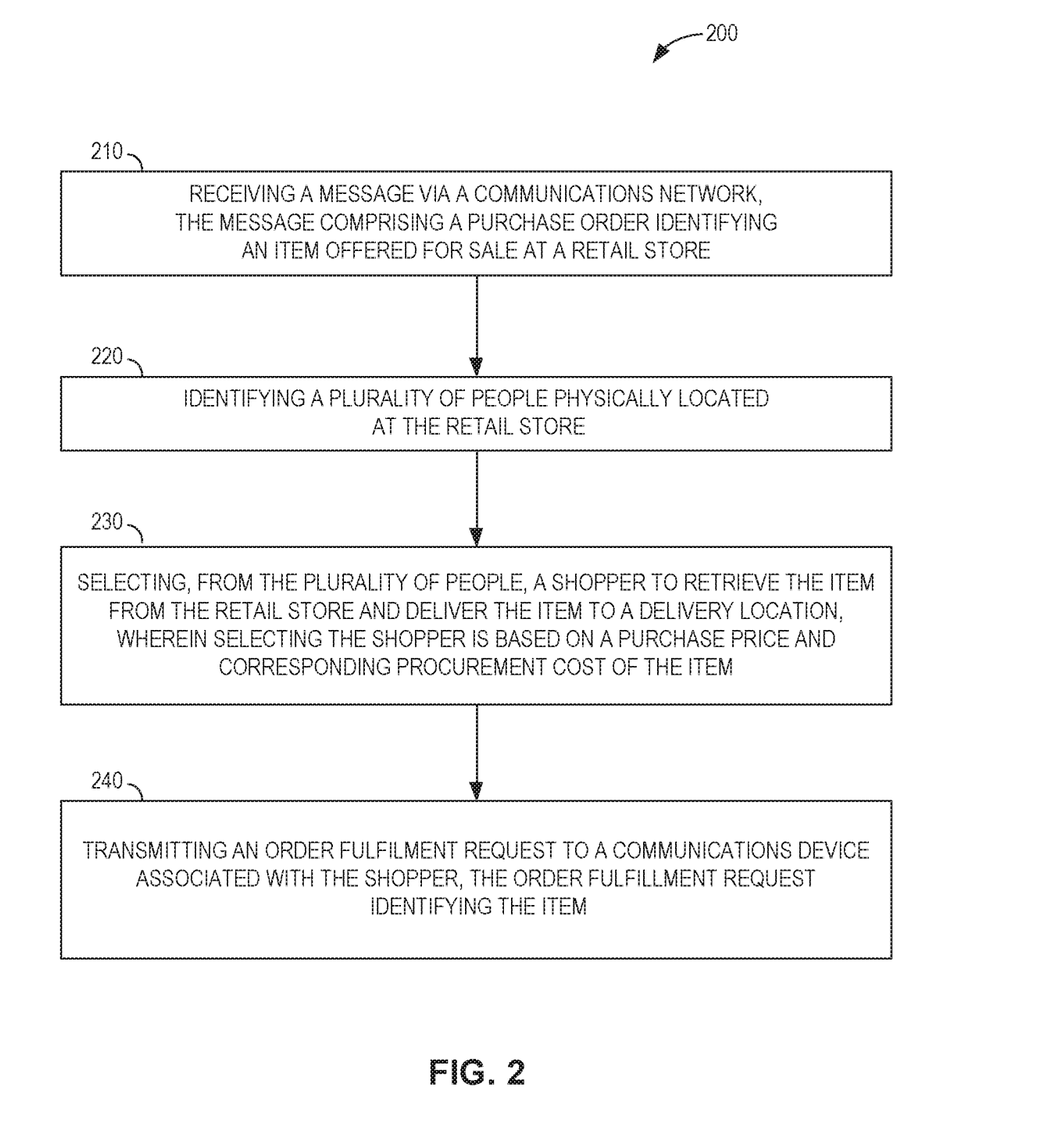
FIG. 2 is a flow diagram illustrating an example method of selecting a shopper according to embodiments of the present disclosure.

In view of the above, FIG. 2 illustrates a relatively simple example method 200 for selecting a shopper, as implemented by a computing device 110 and in accordance with particular embodiments of the present disclosure. The example method 200 comprises receiving a message via a communications network 105. This message comprises a purchase order identifying an item offered for sale at a retail store (block 210). The method 200 further comprises identifying a plurality of people physically located at the retail store (block 220). The method further comprises selecting, from the plurality of people, a shopper to retrieve the item from the retail store and deliver the item to a delivery location (block 230). In particular, selecting the shopper is based on a purchase price and corresponding procurement cost of the item. The method further comprises transmitting an order fulfillment request to a communications device associated with the shopper (block 240). In particular, the order fulfillment request identifies the item.

Figure 3:
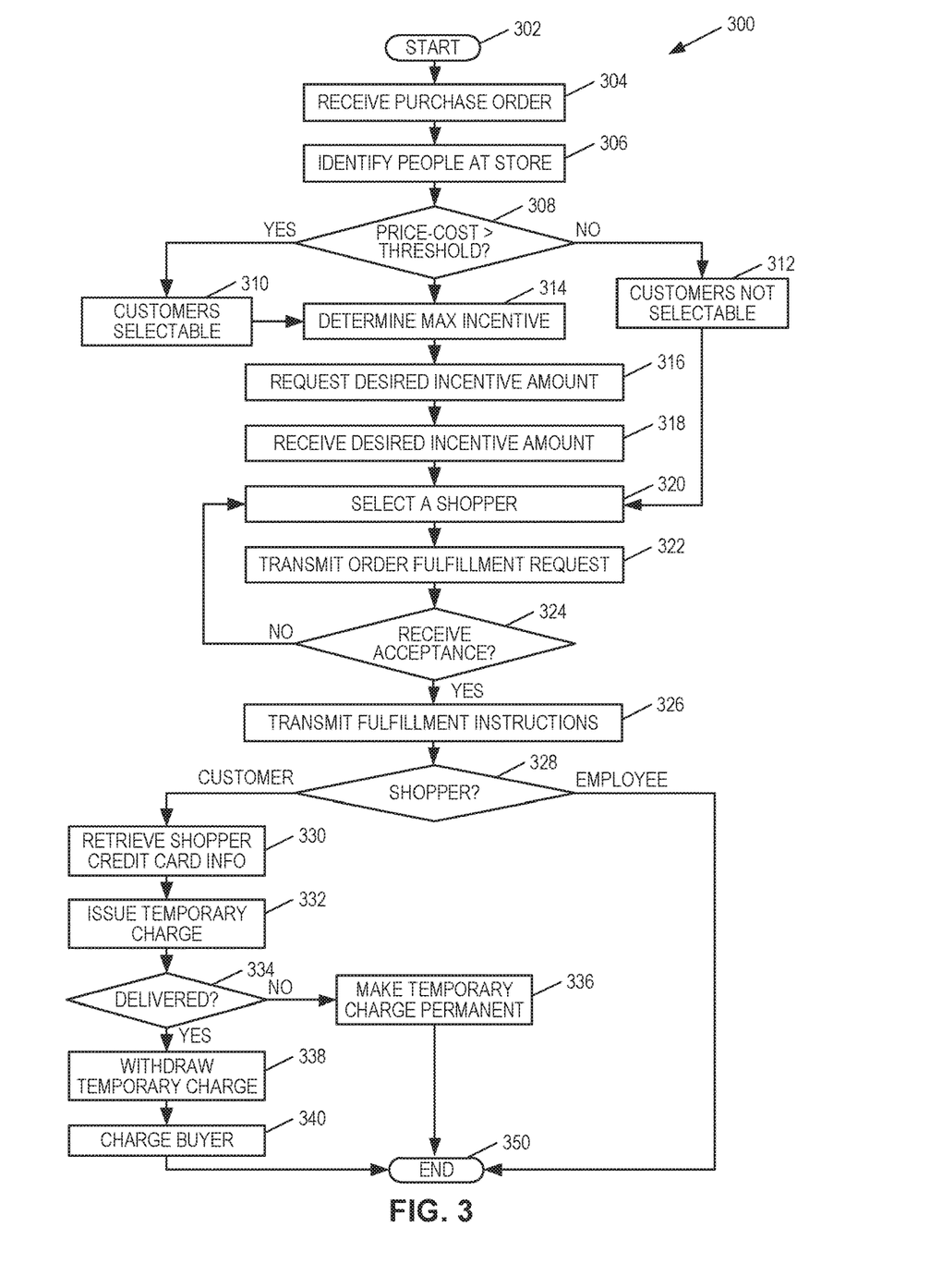
FIG. 3 is a flow diagram illustrating a more detailed example method of selecting a shopper according to embodiments of the present disclosure.

More detailed embodiments are also possible, such as the more detailed example method 300 for selecting a shopper illustrated in FIG. 3. The more detailed method 300 starts (block 302) by the computing device 110 receiving a purchase order in an appropriate message via network 105 (block 304). The purchase order identifies an item offered for sale at a retail store. According to embodiments, this purchase order may have been received from user device 115 directly (e.g., as a result of buyer 135 visiting an online ordering website hosted by computing device 110) or indirectly (e.g., from an online ordering server within network 105 acting as an intermediary between the user device 115 and the computing device 110).

The computing device 110 then identifies a plurality of people physically located at the retail store (block 306). According to embodiments, the plurality of people identified comprises one or more employees. Additionally or alternatively, the plurality of people identified may include one or more customers, such as customer 140.

The computing device 110 may identify people physically located at the retail store in a variety of ways, according to various embodiments. For example, to identify that customer 140 is physically located at the retail store, the computing device 110 may detect that mobile device 120 is within a vicinity of the retail store (i.e., within store location 130). The computing device 110 may then determine that the mobile device 120 is associated with customer 140.

For example, the computing device 110 may receive a notification message when the mobile device 120 enters store location 130. This notification message may be generated by an app executing on mobile device 120. Alternatively, the retail store may have one or more wireless receivers (e.g., RFID readers, Wi-Fi access points) at store location 130 that sense wireless transmissions emitted from the mobile device 120. The wireless receiver(s) may then send a notification message to the computing device 110 via network 105 in response to sensing the wireless transmissions of the mobile device 120.

The notification message received by the computing device 110 may include an identifier of the mobile device 120 (e.g., a Media Access Control (MAC) address, phone number, and/or a serial number) and/or an identifier of the customer 140 (e.g., a username). Further, the computing device 110 may use the information in the notification message to determine that the mobile device 120 and customer 140 are associated with one another. For example, the computing device 110 may identify customer 140 by using the information in the notification message to locate a user profile that indicates that mobile device 120 is registered to customer 140. As will be discussed in greater detail below, such a user profile may also contain other information about the customer 140 and/or mobile device 120, such as credit card information, past order fulfillment activity, device details, and so on.

Having identified a plurality of people physically present at the retail store (including customer 140), the computing device 110 may apply one or more selection criteria for selecting a shopper from the identified people. According to the example method illustrated in FIG. 3, the computing device 110 determines whether the one or more identified customers 140 are eligible for selection based on details pertaining to the order. In particular, the computing device 110 may determine whether the one or more identified customers 140 are eligible for selection based on a purchase price and corresponding procurement cost of one or more of the ordered items (block 308).

As previously discussed, having a customer 140 perform certain fulfillment tasks may, in some embodiments, help the retail store avoid incurring the cost of hiring additional staff. Thus, motivating the customer 140 to do such tasks may require offering that customer 140 some form of incentive. If the potential profit margin for an order is small, the amount of incentive that the retail store is able to offer customer 140 while still turning a profit may also be small. Accordingly, the computing device 110 may, according to embodiments, exclude customers 140 from being eligible for selection as the shopper if the difference between the purchase price of the order (i.e., the amount the buyer 135 is paying for the ordered item(s)) and the corresponding procurement cost (i.e., the amount the retail store paid to procure the ordered item(s)) is lower than a threshold (block 312). In such case, the computing device 110 may limit selection to non-customers (e.g., employees). In contrast, if the difference between the purchase price and the corresponding procurement cost is higher than the threshold, the computing device 110 may permit selection of a customer 140 as the shopper (block 310).

If customers are selectable as the shopper, the computing device 110 may determine a maximum permissible incentive amount based on the purchase price and the corresponding procurement cost (block 314). For example, the computing device 110 may set the maximum permissible incentive amount to eighty percent of the difference between the purchase price and the corresponding procurement cost, and reserve the remaining twenty percent as a minimum profit to be earned from the transaction.

The computing device 110 may then request, from each of a plurality of customers comprised in the plurality of identified people, a desired incentive amount for that customer to retrieve and deliver the item (block 316). The computing device 110 may then receive at least one desired incentive amount from the plurality of customers (block 318). For example, the computing device 110 may ask customers in the store how much store credit it would take to get them to fetch a box of diapers from the shelves and bring the diapers to an online ordering pickup location. Customer 140, for example, may respond to this request by indicating, via mobile device 120, that he would be willing to pick up and deliver the diapers for two dollars of store credit.

The computing device 110 may then select, from the plurality of people identified, a shopper to retrieve the item from the retail store and deliver the item to the delivery location (block 320). This selection may be based on any of the criteria described above. For example, selecting the shopper may be based on the purchase price and corresponding procurement cost of the item, as previously described. Additionally or alternatively, selecting the shopper may be based on the maximum permissible incentive amount and the at least one desired incentive amount. For example, the computing device 110 may determine a maximum permissible incentive amount (e.g., five dollars) that is eighty percent of the purchase price (e.g., seven dollars) minus the corresponding procurement cost (e.g., seventy five cents) of an item, and compare this with the lowest desired incentive amount (e.g., two dollars) received from the plurality of identified customers. In this example, since the lowest desired incentive amount of two dollars is less than the maximum permissible incentive amount of five dollars, the computing device 110 may select customer 140, who indicated that they would perform the task for two dollars, to be the shopper. Alternatively, if no customers respond, or if no customers indicate that they would perform the task within the maximum permissible incentive amount, or if it was decided that customers would not be selectable for this order, the computing device 110 may select an employee to be the shopper.

The computing device 110 may additionally or alternatively consider other factors when selecting a shopper, according to embodiments. For example, the computing device 110 may select the shopper based on a profile of one or more of the identified customers. In such an example, the computing device 110 may retrieve the profile from a user profile database that is stored in memory circuitry of the computing device 110, or stored in a remote device attached to the network 105.

According to embodiments, the profile may be based in whole or in part on order fulfillment activity performed by their respective customers in response to at least one previous order fulfillment request. Accordingly, the computing device 110 may, for example, retrieve a profile of customer 140 and decide whether to select customer 140 as the shopper based on whether the customer's 140 order fulfillment history indicates that customer 140 is reliable. If the profile reflects that customer 140 is reliable (e.g., successfully fulfilled numerous previous orders), the computing device 110 may select customer 140. If the profile reflects that customer 140 is not reliable (e.g., is commonly late and/or delivers the wrong item), the computing device 110 may select a different customer or an employee.

The profile may include other details about the customer 140, according to one or more embodiments. For example, the profile may contain an address for customer 140. Accordingly, the computing device 110 may, for example, decide whether to select customer 140 as the shopper based on whether the address for customer 140 is near a desired delivery location for the order. As another example, the profile may contain limitations on the types of items the customer is willing and/or able to deliver. For example, the profile may indicate that customer 140 is unable to lift items heavier than 40 pounds. Accordingly, the computing device 110 may decide whether to select customer 140 based on a comparison between the item ordered and any limitations on item types indicated in the profile.

According to some embodiments, the computing device 110 may compare various factors pertaining to a plurality of identified customers against each other. For example, a first customer may be a more reliable shopper, but a second customer may live closer to the delivery location, while a third customer may be willing to deliver the ordered item for the lowest incentive. In such an example, the computing device 110 may apply a rule-based decision making process that prioritizes certain criteria above other criteria to decide which of the customers, if any, to select as the shopper. Alternatively, the computing device 110 may select a shopper based on a score generated for each customer based on a formula in which each considered factor is associated with a corresponding weight. Other decision-making may also be applied, according to other embodiments.

After the computing device 110 has selected a shopper, the computing device 110 transmits an order fulfillment request to the mobile device 120 associated with the shopper (block 322). The order fulfillment request, according to this example, identifies the item ordered. If the computing device 110 receives an acceptance of the order fulfillment request from the selected shopper (block 324), the computing device 110 may select a different shopper, e.g., using the information previously obtained (block 320). If the computing device 110 receives an acceptance of the order fulfillment request, the computing device 110 may transmit, to the mobile device 120 of the shopper, instructions for retrieving and delivering the item (block 326). For example, computing device 110 may transmit, to the mobile device 120, the desired delivery location (e.g., the address of the buyer 135), and/or a requested time for delivery.

If an employee of the store was selected as the shopper (block 328), the method 300 may end (block 350). However, if a customer 140 was selected as the shopper (block 328), the computing device 110 may perform additional tasks, e.g., to protect the store against loss or theft when delivery the ordered item requires entrusting the item to customer 140 for delivery from the store location 130 to the purchase location 125.

For example, if customer 140 was selected as the shopper, the computing device 110 may retrieve credit card information from the customer's 140 profile (block 330) and issue a temporary charge authorization against the customer 140 for the purchase price using the credit card information (block 332). The computing device 110 may subsequently check whether the items are actually delivered by the shopper (block 334). If the items are not delivered (e.g., by a required deadline indicated in the transmitted instructions and/or order fulfillment request), the computing device 110 may charge the purchase price to the customer 140 using the temporary charge authorization (block 336), and the method 300 will end (block 350). If the items are delivered (e.g., by the required deadline), the computing device 110 may withdraw the temporary charge authorization (block 338) and charge the purchase price to the buyer 135 for whom the item was delivered (block 340), after which the method ends (block 350).

Figure 4:
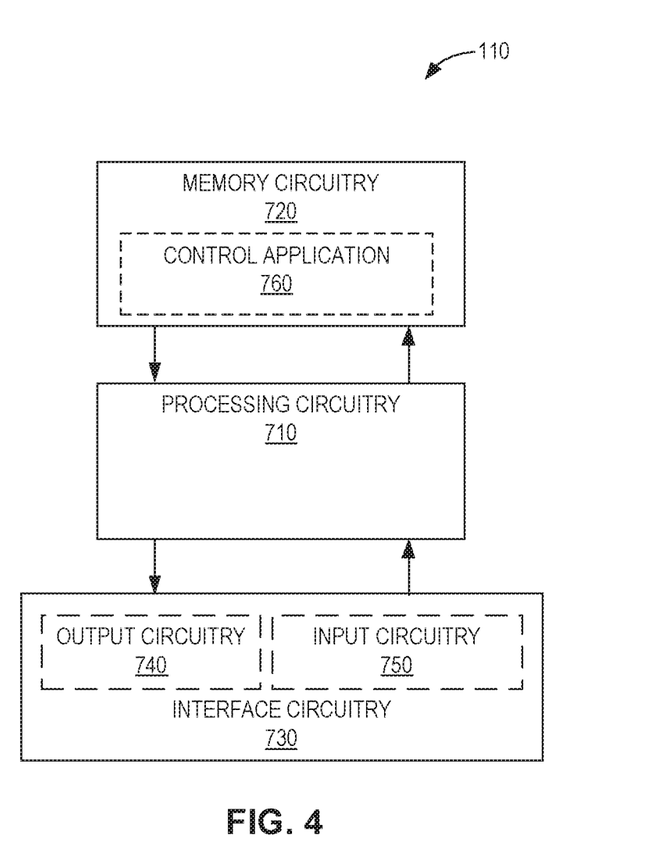
FIG. 4 is a block diagram illustrating example hardware of a computing device according to embodiments of the present disclosure.

Although various embodiments of the present disclosure include methods, such as the example methods 200, 300 described above, as well as other methods including variations of the above, other embodiments include the computing device 110 implemented according to the example hardware illustrated in FIG. 4. The example hardware of FIG. 4 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the computing device 110. Such I/O data paths may include data paths for exchanging signals over the communications network 105 and data paths for exchanging signals with a user. For example, the interface circuitry 730 may comprise a transceiver configured to send and receive communication signals over one or more of a cellular network, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send communication signals over the communications network 105) and input circuitry 750 (e.g., receiver circuitry configured to receive communication signals over the communications network 105). Similarly, the output circuitry 740 may comprise a display, whereas the input circuitry 750 may comprise a keyboard. Other examples, permutations, and arrangements of the above and their equivalents will be readily apparent to those of ordinary skill.

According to embodiments of the hardware illustrated in FIG. 4, the interface circuitry 730 is configured to exchange data with a communications network 105. The processing circuitry 710 is configured to receive a message via the interface circuitry 730 and the communications network 105, the message comprising a purchase order identifying an item offered for sale at a retail store. The processing circuitry 710 is further configured to identify a plurality of people physically located at the retail store, and select, from the plurality of people, a shopper to retrieve the item from the retail store and deliver the item to a delivery location. The processing circuitry 710 is configured to select the shopper based on a purchase price and corresponding procurement cost of the item. The processing circuitry is further configured to transmit, via the interface circuitry 730, an order fulfillment request to a mobile device 120 associated with the shopper. The order fulfillment request identifies the item.

Figure 5:
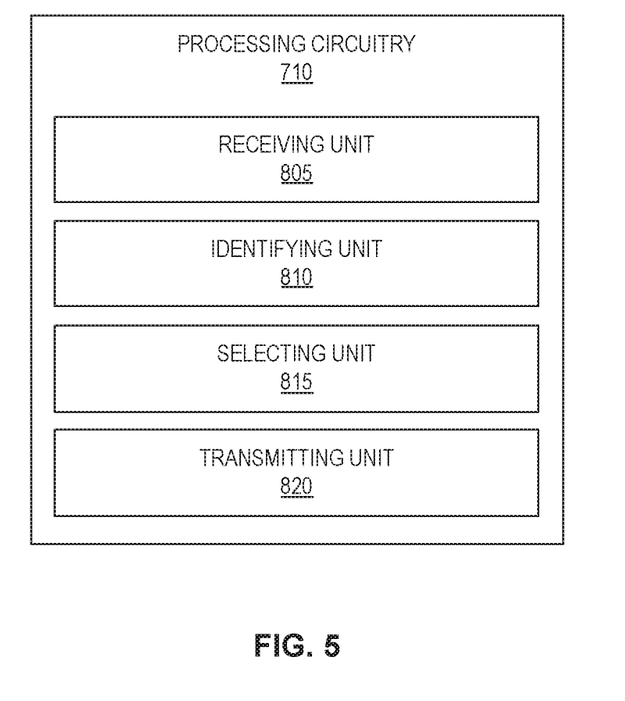
FIG. 5 is a block diagram illustrating example processing circuitry comprising a plurality of hardware units according to embodiments of the present disclosure.

Other embodiments of the present disclosure include the example processing circuitry 710 of the computing device 110 as illustrated in FIG. 5. The processing circuitry 710 comprises a plurality of communicatively coupled physical units. In particular, the processing circuitry 710 comprises a receiving unit 805, an identifying unit 810, a selecting unit 815, and a transmitting unit 820. The receiving unit 805 is configured to receive a message via a communications network 105. The message comprises a purchase order identifying an item offered for sale at a retail store. The identifying unit 810 is configured to identify a plurality of people physically located at the retail store. The selecting unit 815 is configured to select, from the plurality of people, a shopper to retrieve the item from the retail store and deliver the item to a delivery location, wherein selecting the shopper is based on a purchase price and corresponding procurement cost of the item. The transmitting unit 820 is configured to transmit an order fulfillment request to a mobile device 120 associated with the shopper. The order fulfillment request identifies the item.

Figure 6:
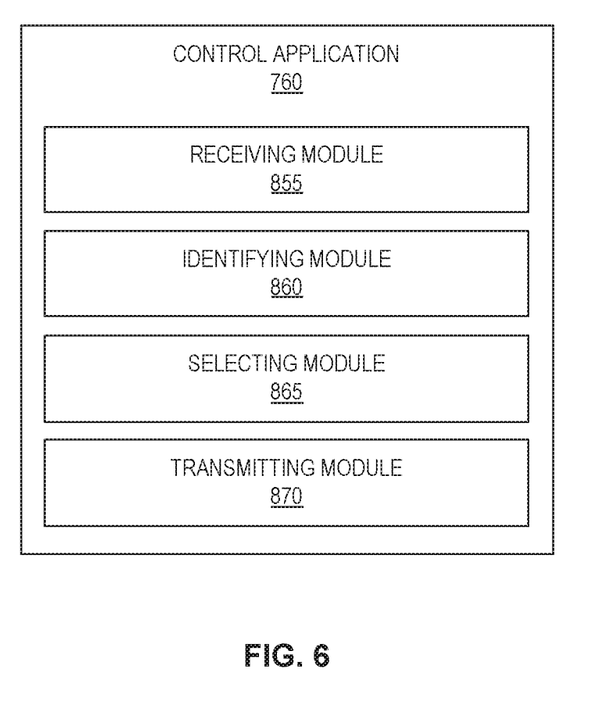
FIG. 6 is a block diagram illustrating an example control application comprising a plurality of software modules according to embodiments of the present disclosure.

Other embodiments of the present disclosure include the example control software 760 of computing device 710, as illustrated in FIG. 6. The control software 760 of FIG. 6 comprises a plurality of software modules. In particular, this control software 760 comprises a receiving module 855, an identifying module 860, a selecting module 865, and a transmitting module 870. The receiving module 855 is configured to receive a message via a communications network 105. The message comprises a purchase order identifying an item offered for sale at a retail store. The identifying module 860 is configured to identify a plurality of people physically located at the retail store. The selecting module 865 is configured to select, from the plurality of people, a shopper to retrieve the item from the retail store and deliver the item to a delivery location, wherein selecting the shopper is based on a purchase price and corresponding procurement cost of the item. The transmitting module 870 is configured to transmit an order fulfillment request to a mobile device 120 associated with the shopper. The order fulfillment request identifies the item.

Yet other embodiments include a non-transitory computer readable medium 720 storing a computer program product 760 for controlling a programmable computing device 110 in a communication network 105, the computer program product 760 comprising software instructions that, when run on the programmable computing device 110, cause the programmable computing device 110 to receive a message via the communications network 105. The message comprises a purchase order identifying an item offered for sale at a retail store. The software instructions further cause the programmable computing device 110 to identify a plurality of people physically located at the retail store, and select, from the plurality of people, a shopper to retrieve the item from the retail store and deliver the item to a delivery location. Selecting the shopper is based on a purchase price and corresponding procurement cost of the item. The software instructions further cause the programmable computing device 110 to transmit an order fulfillment request to a mobile device 120 associated with the shopper. The order fulfillment request identifies the item.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a computing device, the method comprising:
   receiving a message via a communications network, the message comprising a purchase order identifying an item offered for sale at a retail store;
   receiving a plurality of mobile device identifiers from one or more wireless receivers within the retail store;
   identifying a plurality of people physically located at the retail store by locating user profiles, stored in a user profile database, that are associated with at least some of the mobile device identifiers;
   determining a maximum permissible incentive amount based on a purchase price and a corresponding procurement cost of the item;
   requesting, from each of a plurality of customers comprised in the plurality of people, a desired incentive amount for that customer to retrieve and deliver the item;
   receiving at least one desired incentive amount from the plurality of customers;
   selecting, from the plurality of people, a shopper to retrieve the item from the retail store and deliver the item to a delivery location, wherein selecting the shopper is based on the purchase price, the corresponding procurement cost of the item, the maximum permissible incentive amount, the at least one desired incentive amount, and the user profile of the shopper;
   transmitting an order fulfillment request to a mobile device having a mobile device identifier received from the one or more wireless receivers and associated with the user profile of the shopper, wherein the order fulfillment request identifies the item.

2. The method of claim 1, wherein selecting the shopper based on the user profile of the shopper comprises selecting the shopper based on order fulfillment activity comprised in the user profile of the shopper, wherein the order fulfillment activity was performed by the shopper in response to at least one previous order fulfillment request.

3. The method of claim 1 wherein identifying the plurality of people comprises detecting that the mobile device is within a vicinity of the retail store and determining that a customer is associated with the mobile device.

4. The method of claim 1 wherein:
   selecting the shopper comprises selecting a customer as the shopper;
   the method further comprises:
      retrieving credit card information from the profile;
      issuing a temporary charge authorization against the customer for the purchase price using the credit card information;
      determining that the item has been delivered to the delivery location, and in response:
         withdrawing the temporary charge authorization; and
         charging the purchase price to a buyer, distinct from the customer, for whom the item was delivered to the delivery location.

5. The method of claim 1, wherein:
   identifying the plurality of people comprises identifying an employee of the retail store and a customer of the retail store;
   selecting the shopper comprises selecting the employee rather than the customer based on a difference between the purchase price and the corresponding procurement cost being less than a threshold.

6. The method of claim 1, further comprising transmitting, to the mobile device of the shopper, instructions for the retrieving and the delivering of the item.

7. The method of claim 1, further comprising transmitting, to the mobile device of the shopper, a shopping incentive to retrieve and deliver the item based on the purchase price and corresponding procurement cost of the item.

8. The method of claim 1, wherein the delivery location is an address associated with a buyer, distinct from the shopper, for whom the item is to be delivered to the delivery location.

9. A computing device comprising:
   interface circuitry configured to exchange data with a communications network;
   processing circuitry communicatively coupled to the interface circuitry and configured to:

receive a message via the interface circuitry and the communications network, the message comprising a purchase order identifying an item offered for sale at a retail store;

receive a plurality of mobile device identifiers from one or more wireless receivers within the retail store;

identify a plurality of people physically located at the retail store by locating user profiles, stored in a user profile database, that are associated with at least some of the mobile device identifiers;

determine a maximum permissible incentive amount based on a purchase price and a corresponding procurement cost of the item;

request, from each of a plurality of customers comprised in the plurality of people, a desired incentive amount for that customer to retrieve and deliver the item;

receive at least one desired incentive amount from the plurality of customers;

select, from the plurality of people, a shopper to retrieve the item from the retail store and deliver the item to a delivery location, wherein selecting the shopper is based on the purchase price, the corresponding procurement cost of the item, the maximum permissible incentive amount, the at least one desired incentive amount, and the user profile of the shopper;

transmit, via the interface circuitry, an order fulfillment request to a mobile device having a mobile device identifier received from the one or more wireless receivers and associated with the user profile of the shopper, wherein the order fulfillment request identifies the item.

10. The computing device of claim 9, wherein to select the shopper based on the user profile of the shopper, the processing circuitry is configured to select the shopper based on order fulfillment activity comprised in the user profile of the shopper, wherein the order fulfillment activity was performed by the shopper in response to at least one previous order fulfillment request.

11. The computing device of claim 9 wherein to identify the plurality of people, the processing circuitry is configured to detect that the mobile device is within a vicinity of the retail store and determine that a customer is associated with the mobile device.

12. The computing device of claim 9 wherein:
to select the shopper, the processing circuitry is configured to select a customer as the shopper;
the processing circuitry is further configured to:
retrieve credit card information from the profile via the interface circuitry;
issue a temporary charge authorization against the customer for the purchase price using the credit card information;
determine that the item has been delivered to the delivery location, and in response:
withdraw the temporary charge authorization; and
charge the purchase price to a buyer, distinct from the customer, for whom the item was delivered to the delivery location.

13. The computing device of claim 9, wherein:
to identify the plurality of people, the computing device is configured to identify an employee of the retail store and a customer of the retail store;
to select the shopper, the computing device is configured to select the employee rather than the customer based on a difference between the purchase price and the corresponding procurement cost being less than a threshold.

14. The computing device of claim 9, wherein the computing device is further configured to transmit, to the mobile device of the shopper via the interface circuitry, instructions for the retrieving and the delivering of the item.

15. The computing device of claim 9, wherein the computing device is further configured to transmit, to the mobile device of the shopper via the interface circuitry, a shopping incentive to retrieve and deliver the item based on the purchase price and corresponding procurement cost of the item.

16. The computing device of claim 9, wherein the delivery location is an address associated with a buyer, distinct from the shopper, for whom the item is to be delivered to the delivery location.

17. A non-transitory computer readable medium storing a computer program product for controlling a programmable computing device in a communication network, the computer program product comprising software instructions that, when run on the programmable computing device, cause the programmable computing device to:

receive a message via the communications network, the message comprising a purchase order identifying an item offered for sale at a retail store;

receive a plurality of mobile device identifiers from one or more wireless receivers within the retail store;

identify a plurality of people physically located at the retail store by locating user profiles, stored in a user profile database, that are associated with at least some of the mobile device identifiers;

determine a maximum permissible incentive amount based on a purchase price and a corresponding procurement cost of the item;

request, from each of a plurality of customers comprised in the plurality of people, a desired incentive amount for that customer to retrieve and deliver the item;

receive at least one desired incentive amount from the plurality of customers;

select, from the plurality of people, a shopper to retrieve the item from the retail store and deliver the item to a delivery location, wherein selecting the shopper is based on the purchase price, the corresponding procurement cost of the item, the maximum permissible incentive amount, the at least one desired incentive amount, and the user profile of the shopper;

transmit an order fulfillment request to a mobile device having a mobile device identifier received from the one or more wireless receivers and associated with the user profile of the shopper, wherein the order fulfillment request identifying identifies the item.

18. The non-transitory computer readable medium of claim 17, wherein to select the shopper based on the user profile of the shopper, the programmable computing device is caused to select the shopper based on order fulfillment activity comprised in the user profile of the shopper, wherein the order fulfillment activity was performed by the shopper in response to at least one previous order fulfillment request.

19. The non-transitory computer readable medium of claim 17, wherein to identify the plurality of people, the programmable computing device is caused to detect that the mobile device is within a vicinity of the retail store and determine that a customer is associated with the mobile device.

20. The non-transitory computer readable medium of claim 17, wherein:

to identify the plurality of people, the programmable computing device is caused to identify an employee of the retail store and a customer of the retail store;

to select the shopper, the programmable computing device is caused to select the employee rather than the customer based on a difference between the purchase price and the corresponding procurement cost being less than a threshold.

* * * * *